July 16, 1929.                A. KLUG                1,720,735
                           NAPPING MACHINE
                         Filed June 29, 1926           3 Sheets-Sheet 1
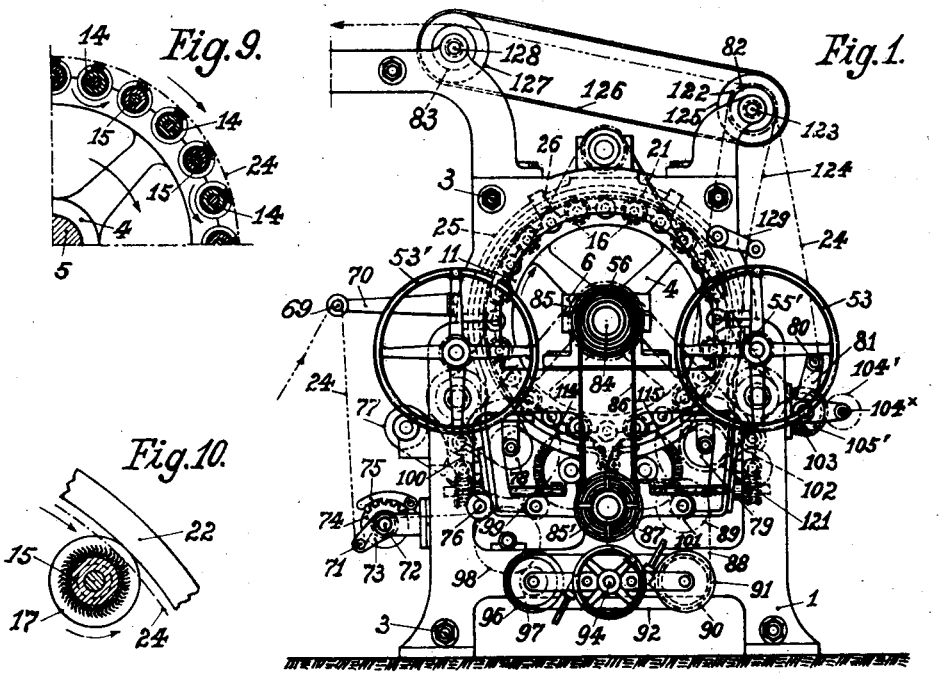
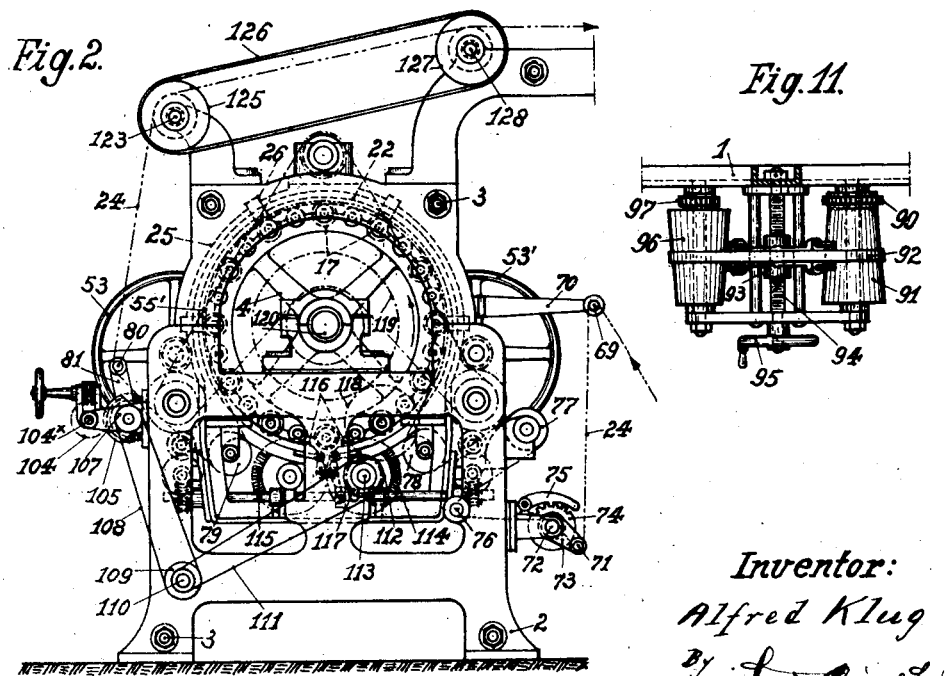
Inventor:
Alfred Klug July 16, 1929.  A. KLUG  1,720,735
NAPPING MACHINE
Filed June 29, 1926  3 Sheets-Sheet 2

Inventor:
Alfred Klug
By
Attorney.

July 16, 1929.  A. KLUG  1,720,735
NAPPING MACHINE
Filed June 29, 1926  3 Sheets-Sheet 3

Inventor:
Alfred Klug
Attorney.

Patented July 16, 1929.

1,720,735

UNITED STATES PATENT OFFICE.

ALFRED KLUG, OF CRIMMITSCHAU, GERMANY.

NAPPING MACHINE.

Application filed June 29, 1926, Serial No. 119,391, and in Switzerland May 10, 1926.

My present invention relates to pile raising or napping-machines wherein the napping rollers are arranged in annular sets or series in the form of a rotatable drum in which the napping rollers are rotated around their own axes.

The more particular object of my invention is to provide means whereby the resistance against rotation and consequently the speed of rotation of the napping rollers is regulated by the aid of which the rotation of the napping rollers of the different sets or series is accomplished with ease and exactness in such a novel and advantageous manner as to permit not only an exceedingly simple construction of the machine—notwithstanding the high demands made on the driving mechanism of the napping rollers—but also to warrant an extraordinary delicate differentiation of the circumferential speeds of the different sets of napping rollers one from another and from the circumferential speed of the napping drum. To this end I provide for each set of napping rollers a transversely slit friction ring adapted to be axially adjusted on the friction cones of said napping rollers and thus rotate the latter with a higher or a lower circumferential speed according to the momentary position of the friction ring on said friction cones.

To enable each friction ring to act in every position on the friction cones of the napping rollers concentrically and with an even pressure, it must be adapted to be expanded or contracted simultaneously with its axial adjustment. It is therefore necessary to bring the mechanism employed for the expansion and contraction of the friction ring in dependance on the mechanism employed for the axial adjustment of the friction ring on the friction cones and thus obtain the exact internal diameter of the friction ring due to its position on said friction cones automatically.

Since it is impossible to satisfactorily rotate the napping rollers by a friction ring made of iron or another suitable material when brought into direct contact with the friction cones of the napping rollers when these cones are likewise made of iron or another metal, the friction cones are faced or covered with a frictional material such as leather, card-board, vulcanic fibre and the like. It is of great importance that this frictional material is arranged on the friction cones and not on the internal face of the friction ring, while only thus it is made possible to avoid an excessive heating of the friction ring, because the aggregate surface of contact of the friction cones is considerably larger than the surface of contact of the friction ring, and besides this, said friction cones are on account of their rotation more thoroughly cooled than the friction surface of the ring.

There are still other novel and advantageous features extant which will be more fully explained in the specification.

In the accompanying drawings, which illustrate my invention by way of example:—

Figure 1 is a more or less diagrammatically represented elevation of one end of my improved napping-machine, and Figure 2 is a similar view of the other end thereof.

Figure 9 illustrates the manner the fabric is passed over the napping rollers.

Figure 10 is a view similar to Figure 9 to explain the direction of rotation of the napping rollers.

Figure 11 is a plan view of a cone-pulley drive.

Figure 3:
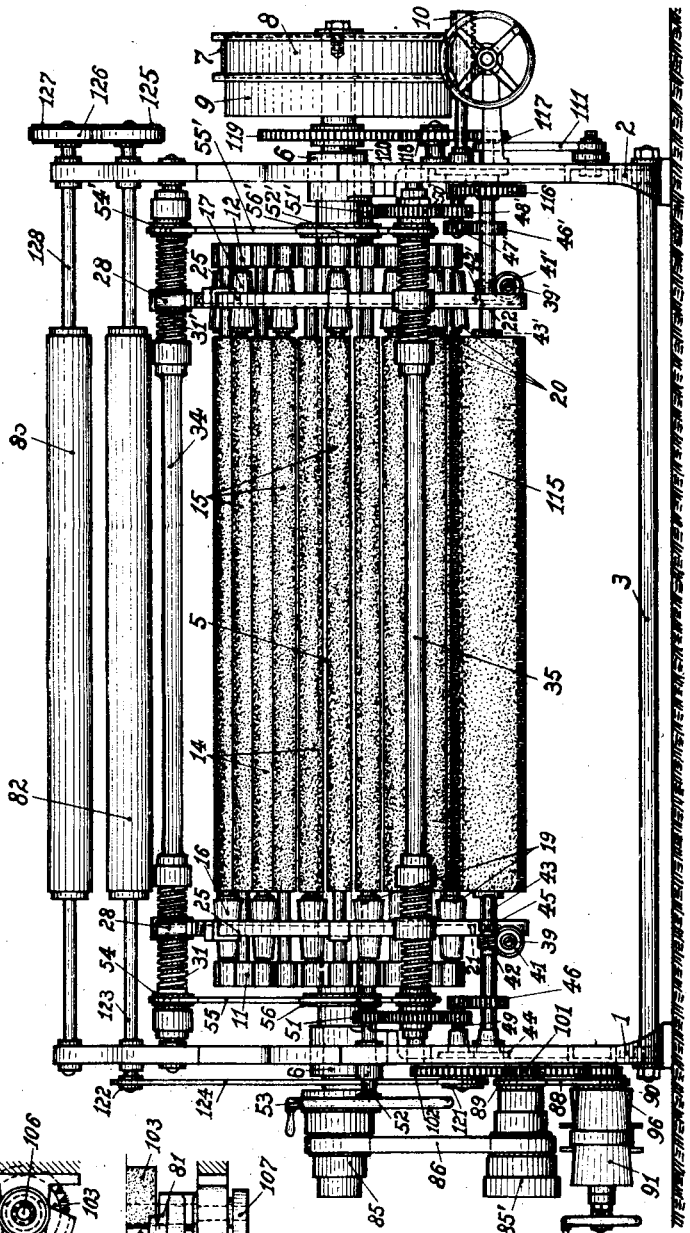
Figure 3 is a side elevation of the machine of which certain parts are omitted for the sake of clearness.
Figure 4:
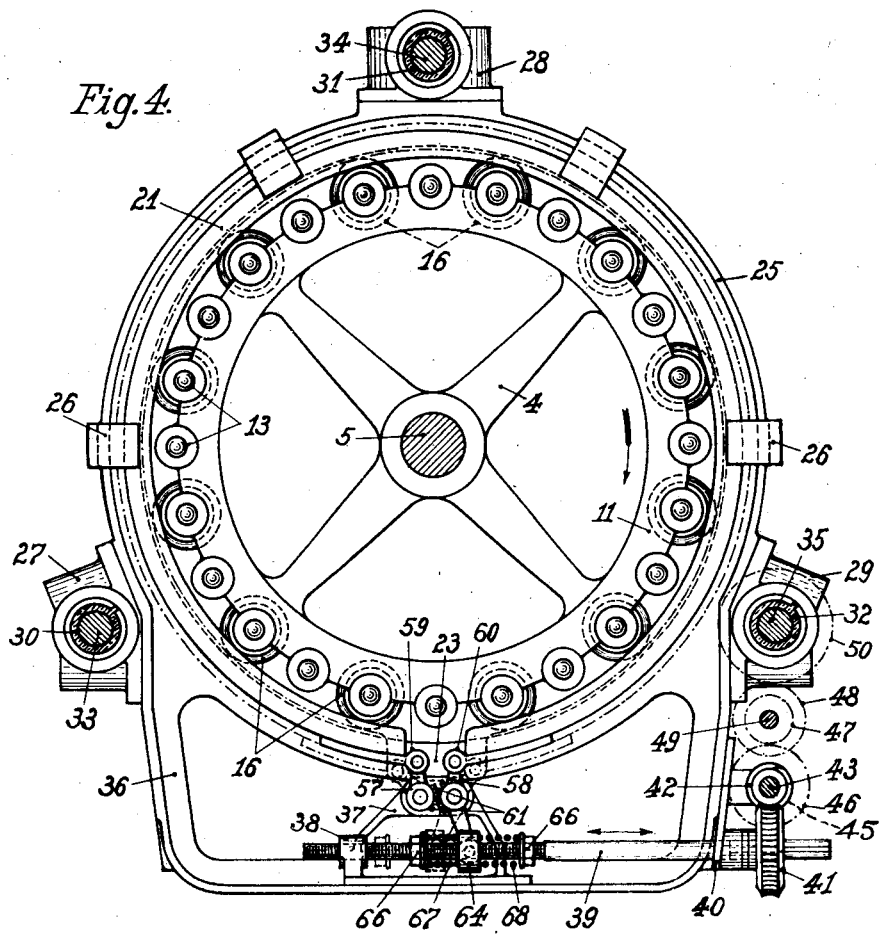
Figure 4 is an elevation of a slit friction ring, of the guide frame thereof, and of the means more particularly employed for the expansion and contraction of said friction ring.
Figure 5:
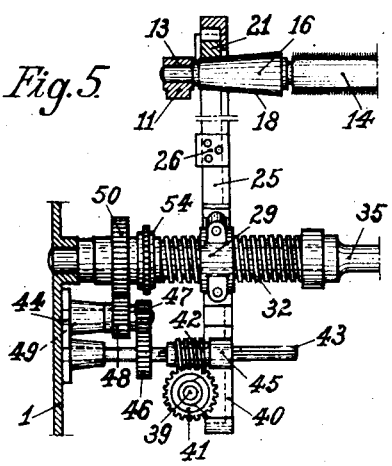
Figures 5 and 6 are details of construction of the means employed to axially shift and radially expand and contract said friction ring.
Figure 6:
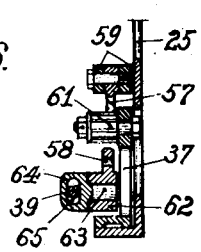

The frame of the napping-machine preferably consists of heavily ribbed heads 1 and 2 firmly connected by a plurality of stay-rods 3. Within this frame the rigid elements of a napping drum 4 are arranged whose shaft 5 is journalled in bearings 6 carried by the heads 1 and 2. This shaft is rotated in the usual manner by a belt 7 shifted on the pulleys 8 and 9 by a belt-shifter 10, Fig. 1. Each of the annular rims 11 and 12 of the drum 4 is provided with a series of bearings 13 for the shafts of napping rollers 14 and 15 armed in the usual manner with card cloth and each napping roller carries a frustum of a cone, hereinafter designated as friction cones 16 and 17 respectively. Each of these friction cones is in turn provided with a facing or covering 18 of a suitable frictional material, such as leather, card-board, vulcanic fibre and the like. All napping rollers are arranged in two sets or groups 19 and 20, of which the set 19 contains the friction cones 16 and is arranged near said rim 11, whereas the set 20 contains the friction cones 17 and placed in close proximity to the rim 12, as shown in Figure 3. The napping rollers 14 and 15 of these two sets are alternately disposed and complete the napping drum 4. To differentiate the circumferential speed of these two sets of napping rollers with ease and exactness one from another and from the circumferential speed of the drum to obtain any desirable degree of napping effect, a non-rotating friction ring 21 is provided for the set 19 and another similar ring 22 for the set 20. Each of these friction rings stands with its internal face in driving contact with the facings of all the friction cones of its own set. To permit each friction ring to be moved lengthwise on the friction cones of its own set to vary thereby the circumferential speed of the napping rollers of this particular set at will, the friction ring is slit. The gap 23 thus made is arranged beneath the drum 4 because the fabric 24 does not pass this point on its passage through the machine. Since every friction ring must take up the working resistance of all the napping rollers of its own set, it is suitably guided and supported. In the present invention this is accomplished by an annular guide frame 25 of L-shaped cross section shown on a larger scale in Figures 5 and 6. A guide frame of a U-shaped or another suitable cross section may be employed if so desired. To let the friction ring 21 not tilt in the guide frame 25, cleats 26 are provided which permit the expansion and contraction of the friction ring at right angles to the axis of the napping drum 4 but prevent any axial movements of the ring 21 in said frame when pushed lengthwise over the facings 18 of the friction cones 16. Said guide frame not only contains the friction ring 21 but also carries the most important elements required for the exact and reliable actions of the friction ring. To receive these elements the frame 25 is provided with collars or detachable nuts 27, 28 and 29 for the reception of externally threaded adjusting sleeves 30, 31 and 32 rotatably mounted on stationary carrier rods 33, 34 and 35 respectively, which rods are securely held by the frame-heads 1 and 2. The downwardly directed extension 36 of the frame 25 carries a small auxiliary frame 37 provided with a nut 38 for the reception of an adjusting screw 39 journalled at its outer end in a bracket 40. On this screw is slidingly seated a worm-wheel 41 driven by a worm 42 likewise slidingly seated on a shaft 43 journalled at one end in a bracket 44 secured to the frame-head 1, and at the other end in a bearing 45 of said bracket 40, see Figures 3, 4 and 5. The worm 42 receives its rotation from a train of gearing of which the wheel 46 is secured to said shaft 43. Of the intermediate wheels 47 and 48, preferably cast in one piece and loosely seated on a stud 49 of the bracket 44, the smaller wheel 47 meshes with said wheel 46 whereas the larger wheel 48 meshes with a wheel 50 rigidly connected with the sleeve 32. This wheel stands in mesh with a pinion 51 seated on a shaft 52 journalled in the frame-head 1 and is operated by means of a hand-wheel 53. To transmit the rotation of the sleeve 32 simultaneously to the adjusting sleeves 30 and 31 each of these three sleeves is provided with a chain-wheel 54 over which an endless chain 55 is passed, which is guided across the shaft 5 by the aid of a chain-wheel rim 56—or an externally channelled ring or the like—loosely seated on said shaft, Figures 1, 2 and 3. To utilize the action of the adjusting screw 39 for the exact expansion and contraction of the friction ring 21 levers 57 and 58 are pivoted to the auxiliary frame 37 and linked near the gap 23 to the friction ring 21 by means of eyes 59 and 60 respectively. The levers 57 and 58 are provided with a mutilated pinion 61 each, which preferably mesh without play to assure a faultless transmission of motion between the adjusting screw 39 and the friction ring 21. The longer arm of the lever 58 carries an eye 62 for the reception of the pintle 63 of a claw 64 provided with a vertical slot 65 to allow sufficient play for the adjusting screw 39 when the lever 58 is swung to and fro. Upon the adjusting screw 39 are adjustably arranged two abutments 66 between which and said claw 64 helical springs 67 and 68 are placed to obtain a certain amount of elasticity eventually required when a change in the direction of motion takes place in the friction ring or in the adjusting screw. Besides this the elasticity thus gained ensures a smooth action of the slit and non-rotating friction ring and of the adjusting screw cooperating therewith.

From the description given above it will be apparent that when the adjusting screw 39 is advanced to the left the friction ring 21 will be opened and simultaneously therewith the threaded sleeves 30, 31 and 32 will be rotated to move said ring lengthwise on the friction cones 16 of the set 19 toward the larger ends thereof. But when the adjusting screw 39 is moved toward the right said friction ring will be closed and simultaneously moved toward the smaller ends of said friction cones 16. In both instances the friction ring is thus always kept in a true concentric position on said friction cones and encircles them with an even contact-pressure adapted to keep the friction ring and the friction cones under the exclusion of an accidental slip uninterrupted in driving contact. All elements employed to obtain these synchronic actions of the friction ring are in the first place designed with a view to attain this result entirely automatically.

The relationship shown to exist between the friction ring 21 and the set 19 of the friction cones 16 likewise exists in every particular between the friction ring 22 and the set 20 of the friction cones 17. To avoid a mere repetition of the above description of such relationship and yet preserve a clear oversight over the essential features of my invention the same—but indexed—characters of reference are here employed for similar parts.

The cloth or fabric to be napped by the aid of the novel mechanisms described above is passed through the machine as follows: The fabric 24 is first thrown over a rod 69 carried by arms 70 and thence passed in succession around a rod 71 and a shaft 72 of which the former is carried by arms 73 secured to said shaft 72. The resistance of the fabric can be regulated at this point by means of a toothed disc 74, likewise seated on said shaft 72, and a toothed lever 75 cooperating therewith. The fabric is then passed around a rod 76 and a rotatory steam receptacle 77 and thence around a powerdriven intake-roller 78. Just above this roller the fabric is brought into contact with the napping rollers 14 and 15 alternately arranged in the drum 4 as explained above. The contact between the fabric and the napping roller is maintained by a powerdriven draw-off roller 79. From here the fabric is led around a rod 80 supported by adjustable arms 81 and finally passed out of the machine over the rollers 82 and 83.

Figures 7, 8:
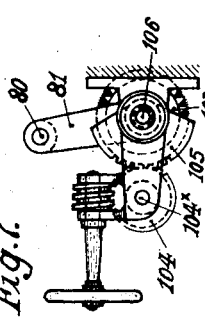
Figure 7 is a side elevation of the mechanism for varying the pressure of the napped fabric on a smoothing brush.
Figure 8 is a plan view of said mechanism.

The intake roller 78 and the draw-off roller 79 are rotated in the following manner:— Upon the stub 84 of the main shaft 5 a stepped cone 85 is seated and its motion transposed by a belt 86 to a second stepped cone 85′ which carries on its inner end a chain-wheel 87. The rotary motion of this wheel is transmitted by an endless chain 88 to the chain-wheels 89 and 90, as shown in Figure 1. The chain-wheel 90 is combined with the cone-pulley 91 of a cone-pulley drive shown in Figures 1 and 11, wherein the belt 92 is shifted by guide fingers carried by a nut 93, which is adjusted by a screw 94 provided with a hand-wheel 95. The second cone 96 of this cone-pulley drive carries on its inner end a pinion 97 in mesh with an idler 98 which transmits its rotary motion by means of a second idler 99 to a spur-wheel 100 seated on the shaft of the intake-roller 78. The draw-off roller 79 is operated in a similar manner by a pinion 101 connected with the chain-wheel 89 and kept in mesh with a spur-wheel 102 seated on the shaft of said draw-off roller. To favorably influence the adhesion of the fabric to this roller by means of the smoothing brush 103 the rod 80 carried by the adjustable arms 81 may be swung more or less outward. To this end a worm-gear drive is provided of which the worm-wheel 104 meshes with a wheel segment 105 connected with the adjacent arm 81 loosely seated upon the shaft 106, Fig. 7, of said brush. The rotary motion of the worm-wheel 104 is preferably transmitted by a shaft 104ˣ to a wheel 104′ in mesh with a wheel segment 105′ of the other arm 81. The brush 103 receives its motion from a pulley 107 likewise secured to the shaft 106 and is connected by a belt 108 to a double pulley 109 carried by a stud 110 of the frame-head 2. The smaller pulley of this double pulley is in turn connected by a belt 111 to a pulley 112 seated upon the shaft 113 of a cleaning brush 114 the motion of which is transmitted to an adjacent cleaning brush 115 by means of a pair of spur-wheels 116. The shaft 113 of the cleaning brush 114 is also provided with a spur-wheel 117 which receives its rotation by means of an idler 118 from a spur-wheel 119 seated on the stub 120 of the main shaft 5, see Figures 2 and 3.

To rotate the rollers 82 and 83 a chain-wheel 121 is seated on the shaft of the draw-off roller 79 and connected with the chain-wheel 122, seated upon the shaft 123 of the roller 82, by means of a driving-chain 124. Upon the shaft 123 is also seated a pulley 125 whose rotation is transmitted by a belt 126 to a pulley 127 secured to the shaft 128 of the roller 83, as shown in Figures 1, 2 and 3. The driving-chain 124 is kept tight by a chain tightener 129 as indicated in Figure 1.

During the time the fabric passes through the machine from the intake-roller to the draw-off roller it is subjected to the action of the napping rollers, whereby the nap is raised by the card cloth of the napping rollers in the usual way. The action of the card cloth may be regulated at any time during the operation of the machine by means of the hand-wheels 53, 53′ without disturbing in any way the operation of the means employed for the rotation of the drum 4 and the means utilized to obtain a uniform passage of the cloth or fabric through the machine.

I claim:—

1. A napping machine comprising a frame, a drum rotatably mounted in said frame, napping rollers journalled in said drum, a friction cone carried by each napping roller, a friction ring encircling said friction cones, said ring being transversely slit only at a single point but otherwise closed, and means for axially adjusting said friction ring on said friction cones.

2. A napping machine comprising a frame, a drum journalled in said frame, napping rollers arranged in sets in said drum, a friction cone carried by each napping roller, a non-rotating friction ring provided for each set of napping rollers and kept in driving contact with the friction cones thereof, said ring being transversely slit only at a single point but otherwise closed, and means for axially adjusting each friction ring on the friction cones of the napping rollers of its own set.

3. A napping machine comprising a frame, a drum journalled in said frame, napping rollers arranged in said drum in two sets, a friction cone carried by each of said napping rollers, a non-rotating friction ring simultaneously in driving contact with all friction cones of the same set of napping rollers, said ring being transversely slit only at a single point but otherwise closed, annular means for each of said friction rings to retain it at right angles to the axis of said drum, means for axially adjusting said friction ring on said friction cones, and means for altering the internal diameter of said friction ring to keep it in driving contact with said friction cones at any position of the friction ring on said friction cones.

4. A napping machine comprising a frame, a drum rotatably mounted in said frame, napping rollers disposed in said drum in two circular sets and rotated around their own axes, a friction cone seated at one end of the axis of each napping roller, a facing of frictional material on each friction cone, a non-rotating friction ring for each circular set of napping-rollers, said ring being transversely slit only at a single point but otherwise closed, an annular guide frame for each of said friction rings, carrier rods sustaining said guide frames, externally threaded adjusting sleeves arranged in two sets on said carrier rods, a set of internally threaded means carried by each guide frame for the reception of one set of said adjusting sleeves, means for rotating each set of adjusting sleeves independently of the other, means for altering the internal diameter of each friction ring, and manually operated means for simultaneously initiating the axial adjustment of said friction ring and a corresponding alteration of the internal diameter thereof.

5. A napping machine comprising a stationary frame, a drum journalled in said frame, napping rollers disposed in said drum in two circular sets whereby the rollers of the one set alternate with the rollers of the other set, a friction cone on one end of the axis of each napping roller, a facing of frictional material on each friction cone, a slit non-rotating metallic friction ring provided for each set of friction rollers and held in driving contact with the facings of an entire set of friction cones, an annular guide frame for each friction ring, carrier rods for sustaining said guide frames concentrically to the axis of said drum, nuts provided on said guide frame, externally threaded adjusting sleeves rotatably mounted on said carrier rods and in working engagement with said nuts, driving means adapted to impart to the adjusting sleeves belonging to the same guide frame simultaneously the same amount of rotation, a one-armed lever and a double-armed lever hinged to the friction ring adjacent to the gap thereof and coupled at their pivots by mutilated pinions, an adjusting screw linked to said double-armed lever, and a manually driven wheel gearing simultaneously operating said adjusting sleeves and said adjusting screw to automatically adjust said friction ring axially on the set of friction cones appertaining thereto and to alter the internal diameter of said friction ring proportionately to said axial adjustment.

6. A napping machine comprising a frame, a drum journalled in said frame, napping rollers arranged in two circular sets in said drum whereby the rollers of the one set alternate with the rollers of the other set, a friction cone on one end of the axis of each napping roller said friction cones being arranged in two sets severally disposed near the ends of said drum, a facing of frictional material on each friction cone, a slit non-rotating metallic friction ring provided for each set of friction rollers and held with its internal face in driving contact with the facings of the entire set of friction cones, an annular guide frame for each friction ring, detachable nuts on each guide frame, a stationary carrier rod passing centrally through each nut, an externally threaded adjusting sleeve seated rotatably on each carrier rod and screwed into the nut surrounding the latter, flexible driving means adapted to impart to all adjusting sleeves belonging to the same guide frame simultaneously the same degree of rotation, a one-armed and a double-armed lever hinged to each friction ring at the gap thereof and coupled at their pivots by mutilated pinions, an adjusting screw carried by said guide frame, adjustable abutments on said adjusting screw, a claw pivoted to the double-armed lever and surrounding said adjusting screw, elastic means interposed between said abutments and said claw, and a manually operated train of gearing for each set of napping rollers adapted to axially adjust the friction ring on the friction cones appertaining thereto and simultaneously alter the internal diameter of said friction ring automatically in due proportion to said axial adjustment.

7. A napping machine comprising in combination a frame, a drum rotatably mounted in said frame, two sets of napping rollers journalled in said drum to have the napping rollers of the one set alternate with the napping rollers of the other set and adapted to have their circumferential speeds differentiated from without at any time during the operation of the machine, a friction cone seated on one end of each napping roller, a facing composed of frictional material applied to each friction cone, a transversely slit non-rotating friction ring for each set of napping rollers, an annular guide frame for each friction ring, carrier rods for severally sustaining said guide frames concentrically on the friction cones of said sets of napping rollers, internally threaded means provided on each of said guide frames, externally threaded guide sleeves loosely mounted on said carrier rods and in operative engagement with said internally threaded means, a chain drive adapted to rotate all adjusting sleeves of the same set simultaneously to the same angular extent, a one-armed and a double-armed lever pivoted to each guide frame whereon they are geared to each other at their pivots and simultaneously hinged to the friction ring seated in said guide frame, an adjusting screw carried by said guide frame and yieldingly connected with said double-armed lever, a worm-wheel drive for each adjusting screw, a manually operated spur-wheel drive for simultaneously actuating a set of said adjusting sleeves and an adjusting screw cooperating therewith, means for passing the fabric through the machine across the drum containing said sets of napping rollers, and means for regulating the tension of the fabric on its passage through the machine.

8. A napping machine comprising in combination a frame, a drum rotatably mounted in said frame, sets of napping rollers journalled in said drum in circular sets wherein the napping rollers of the different sets are positioned alternately and adapted to have their circumferential speed differentiated severally from the circumferential speed of said napping drum, a friction cone on one end of each napping roller, a facing of frictional material on each friction cone, a metallic friction ring transversely slit only at a single point and held in driving contact with all friction cones of the same set of napping rollers, an annular guide frame for each friction ring, means for preventing a tilting of the friction ring in said guide frame, means for axially adjusting each friction ring on the friction cones of its own set of napping rollers independently of the other friction ring, means for expanding and contracting said friction ring automatically in a ratio prescribed by the coincity of the friction cones to obtain for each position of the friction ring on said friction cones the exact internal diameter of said friction ring, means for passing the fabric at a uniform speed across the napping rollers journalled in said drum, and means for regulating the tension of the fabric on its passage through the machine.

9. A napping machine comprising in combination a frame, a drum rotatably mounted in said frame, two sets of napping rollers journalled in said drum, a friction cone seated upon one end of each napping roller, a non-rotating friction ring adapted to engage all friction cones of the same set of napping rollers simultaneously, said ring being transversely slit only at a single point but otherwise closed, an annular guide frame for each friction ring, means for adjusting each friction ring axially on the friction cones encircled by it, means for expanding and contracting said friction ring in due proportion to its axial adjustment on said friction cones, means for initiating both adjustments of each friction ring automatically and simultaneously, means for uniformly rotating said drum, a powerdriven intake roller, a rotatory steam receptacle, a powerdriven draw-off roller, means for regulating the resistance of the fabric on entering the machine, means for regulating the tension of the fabric on leaving the machine, means for regulating the circumferential speed of the intake-roller, means for regulating the circumferential speed of the draw-off roller, rotary brushes for cleaning said napping rollers, and a roller-drive for drawing the fabric upward and passing it out of the machine.

In testimony whereof I affix my signature.

ALFRED KLUG.